United States Patent [19]

Horstmann et al.

[11] Patent Number: 4,814,940
[45] Date of Patent: Mar. 21, 1989

[54] LOW INDUCTANCE CAPACITOR

[75] Inventors: Richard E. Horstmann, Peekskill; James M. Oberschmidt, Stanfordville, both of N.Y.

[73] Assignee: International Business Machines Corporation, Armonk, N.Y.

[21] Appl. No.: 55,216

[22] Filed: May 28, 1987

[51] Int. Cl.$^4$ .................. H01G 1/14; H01G 4/10; H01G 4/38
[52] U.S. Cl. .................. 361/309; 361/330; 361/321
[58] Field of Search ........ 361/272, 274, 275, 328–330, 361/303–305, 308–313, 32 D, 321, 323, 324, 433

[56] References Cited

U.S. PATENT DOCUMENTS

| | | | |
|---|---|---|---|
| 2,608,601 | 8/1952 | Boardman | 361/330 |
| 3,098,955 | 7/1963 | Davis et al. | 361/321 X |
| 3,118,095 | 1/1964 | Baron et al. | 361/308 |
| 3,444,436 | 5/1969 | Coda | 361/309 X |
| 3,859,592 | 1/1975 | Kessler | 361/305 X |
| 4,082,906 | 4/1978 | Amin et al. | 361/309 X |
| 4,551,746 | 11/1985 | Gilbert et al. | 361/414 |

FOREIGN PATENT DOCUMENTS 885756  6/1943  France ................. 361/272

OTHER PUBLICATIONS

Aakalu IBM Technical Disclosure Bulletin, vol. 25, No. 10, Mar. 1983, pp. 5366–5367.

*Primary Examiner*—Donald Griffin
*Attorney, Agent, or Firm*—Ira D. Blecker

[57] ABSTRACT

A capacitor with a low parasitic inductance, which is particularly suited for use as a decoupling capacitor, that has a prismatic or polyhedral shape and includes a plurality of internal capacitor plates positioned and separated by dielectric material. The improvement is that each plate is provided with a tab that projects diagonally to a corner of the body with the edge of the tab exposed. A metal layer on the outside of the body electrically connects the plates in the desired sequence.

11 Claims, 4 Drawing Sheets

LOW INDUCTANCE CAPACITOR

DESCRIPTION

1. Technical Field

This invention relates to capacitors for large scale integration circuit device packaging modules, more particularly to low inductance decoupling ceramic capacitors having multiple capacitor plates which are terminated at the edge surfaces.

2. Background Art

A continuing objective of data processing equipment designers is to produce equipment having increased operating speeds, reduced physical size and lower manufacturing cost. This objective is achieved by packing as many circuit devices as possible into the integrated circuit chips that make up the equipment. By packing as many devices as possible on a chip, the length of the interconnection needed to join the devices is reduced which reduces the current travel time. By increasing the number of circuit devices per chip, the overall number of devices necessary is reduced which allows the overall physical size of the module and the resulting circuitry density to be increased. Further, by increasing the number of devices on the chip, the manufacturing cost per device can be materially reduced.

An effective decoupling capacitor is essential to the noise isolation of very fast switching, highly integrated logic circuit modules so that the switching noise is not coupled between signal lines due to the common primary power source. Decoupling capacitors serve as sources of readily available power for the switching of logic chips. These capacitors discharge rapidly to provide the switching current, and then are re-charged by an external power source. The switching speed of the logic circuit is thus closely related to the inductance of the current path between the chip and the capacitor. Minimizing the inductance involves placing the chip and the capacitor in close proximity and offering a large number of short current paths between the chip and the capacitor. One approach is in the design of a package which places the decoupling capacitors directly adjacent to each chip on top of the substrate.

In order to be as effective as possible, the parasitic inductance of a decoupling capacitor must be low. This invention is a capacitor with a very low inductance.

SUMMARY OF THE INVENTION

It is an object of this invention to provide an improved capacitor having a low parasitic inductance.

A further object of this invention is to provide a novel electrode plate configuration for a capacitor that materially reduces the parasitic inductance of the capacitor.

In accordance with the aforementioned objects of the invention, there is provided a capacitor having a body with a prismatic or polyhedral shape, and including a plurality of internal capacitor plates positioned and maintained in spaced relation with a dielectric material. Each plate is provided with a tab having an end exposed on at least one side of the body. The improvement is the configuration of the plates having a tab that projects diagonally to the corner of the body and has an edge exposed. The plates are arranged within the body with each of the tabs of each plate sequentially projecting to a different corner of the body of the capacitor.

BRIEF DESCRIPTION OF THE DRAWINGS

In the accompanying drawings forming a material part of this disclosure.

DESCRIPTION OF PREFERRED SPECIFIC EMBODIMENT

Figure 1:
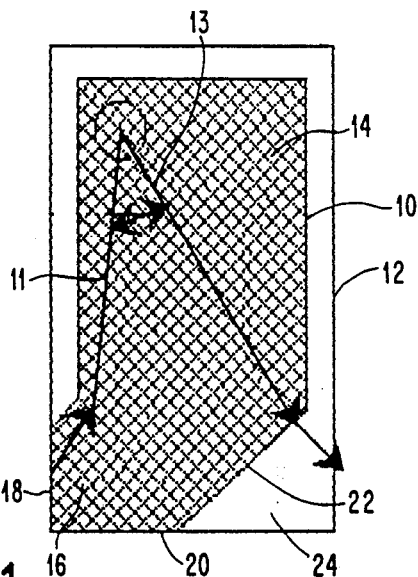
FIG. 1 is a plan view of a preferred embodiment of of the capcitor plate of the invention supported on a sheet of dielectric material.

Referring now to the Figs. of the drawing, and in particular to FIG. 1, there is illustrated a preferred embodiment of a capacitor plate 10 on a sheet 12 of dielectric material. The plate 10 has a major body portion 14 that is basically square or rectangular in shape. A tab portion 16 projects diagonally from the body toward a corner of sheet 12 and terminates at the edges 18 and 20. A corner of the plate adjacent the tab 16 is cut back presenting a diagonal edge 22. This leaves a relatively large triangular area 24 of sheet 12 exposed. As indicated, the plate 10 is recessed inwardly from the edges of sheet 12, except for tab 16.

Plate 10 is formed of a layer of electrically conductive material. A preferred technique of forming the plate is screen printing a paste material through a mask provided with an opening that corresponds to the plate configuration. Any other technique can be used to form plate 10 on the dielectric sheet, including attaching a thin metal layer such as a foil by adhesives, by electroplating a thin layer of conductive metal, etc. The sheet 12 can be any suitable dielectric material. Preferably the sheet is formed of a ceramic material. A preferred mode of fabricating the sheet is preparing a slurry that includes ceramic and/or glass particles, a binder resin, and a solvent for the resin. The slurry is doctor bladed to form a thin sheet which is dried to remove the major portion of the solvent. The plate can be screen printed on the sheet using a suitable metal paste. Since the plate and sheet are subsequently laminated with other plates and sheets and sintered, the meal selected must be capable of withstanding the necessary high sintering temperature. If the ceramic is alumina or other materials that require a high sintering temperature, the metal must be a refractory metal, such as molybdenum, tantalum or tungsten. The sintering is preceded by a high temperature heating step to burn off the binder resin and solvent.

Figure 2:
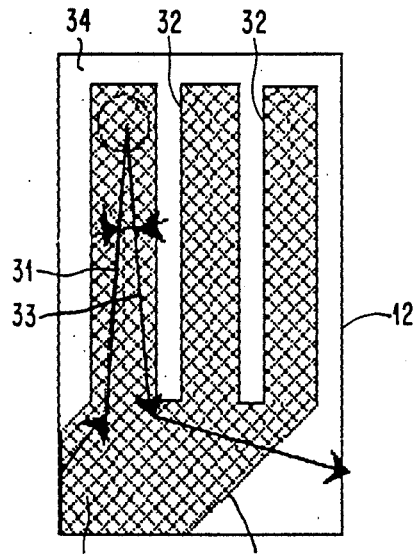
FIG. 2 is another plan view of yet another preferred embodiment of a capacitor plate of the invention supported on a sheet of dielectric material.

FIG. 2 depicts a variation of the plate shown in FIG. 1. Plate 30 mounted on sheet 12 has the same overall shape as the plate 10 in FIG. 1, including the diagonal tab 16 and and diagonal edge 22, but in addition has one or more slots 32 projecting inwardly from side 34 opposite tab 16.

Figure 3:
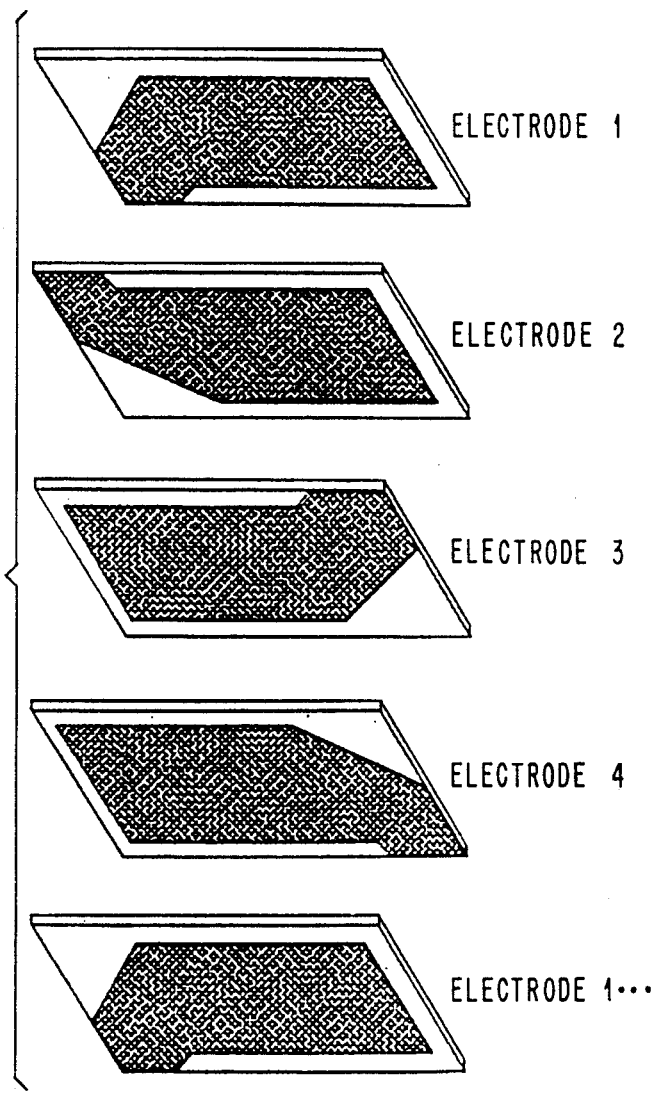
FIG. 3 is an exploded view of a series of capacitor plates illustrating their arrangements in a capacitor.

Referring now to FIG. 3, an orientation of the capacitor plates in a sequence of dielectric sheets is depicted. Note that in electrodes 1 through 4 the tabs 16 are exposed at 4 different corners of sheets 12. The orientation repeats itself in each sequence of 4 sheets. The effect of the plate shape and the tab orientation in reducing internal parasitic inductance of the resultant capacitor will be explained later.

Figure 4:
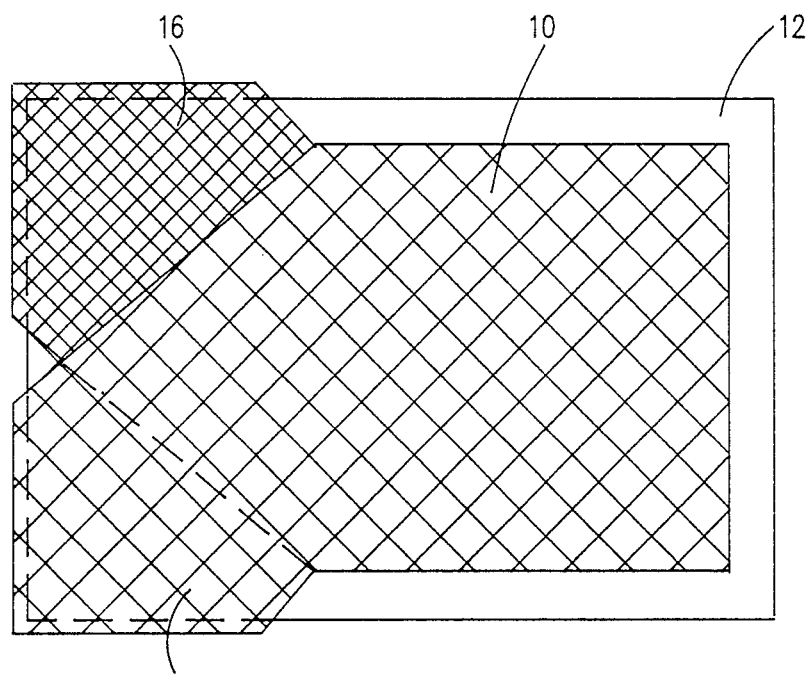
FIG. 4 is a plan view of a preferred embodiment of a capacitor that illustrates an alternate sequential arrangement of the plates.

FIG. 4 depicts another orientation sequence of the capacitor plates 10 in a capacitor body. Note that the tabs 16 of two succeeding plates 10 are oriented toward adjacent corners. The plates are arranged in a sequence of two sheets, i.e, the orientation repeats itself every two sheets.

Figure 5:
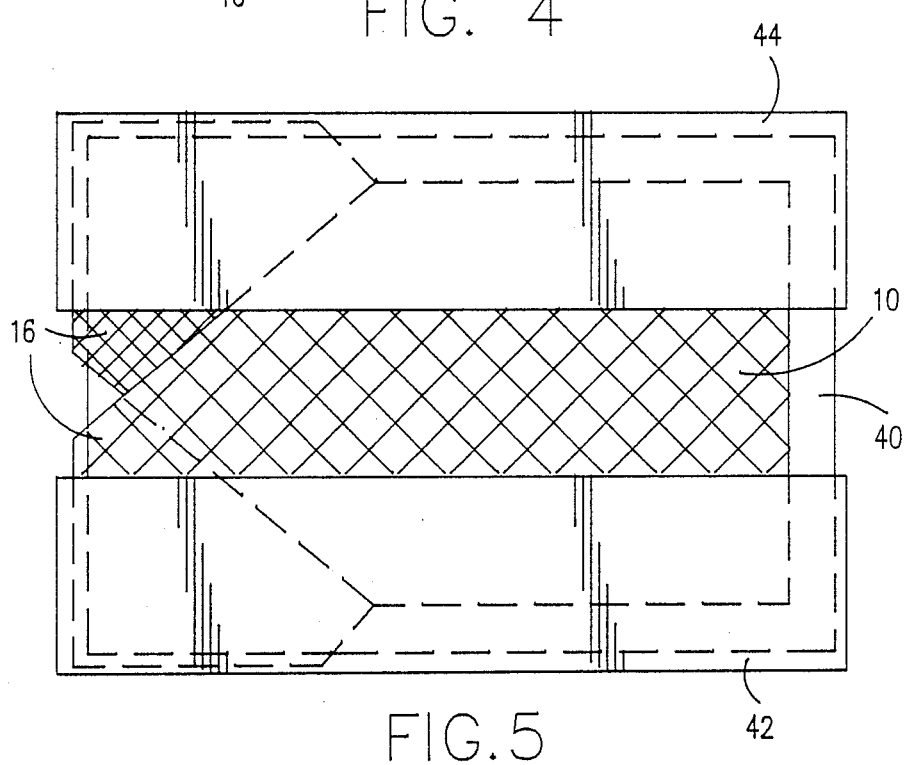
FIG. 5 is a plan view of a complete capacitor including the terminals.

Referring now to FIG. 5, there is depicted a complete capacitor 40, and including terminals 42 and 44. Each of terminals 42 and 44 consist of a coating of metal that covers approximately the lower or upper one-third of the surface area of the capacitor body. The tabs of the plates in the capacitors are in electrical contact with these terminals. With the arrangement of plates shown in FIG. 3 each terminal is connected to a series of plates. The tabs are exposed along the edges of the capacitor body.

When the plates 10 are arranged in the sequence shown in FIG. 4, i.e., a repeating sequence of two, alternating plates are connected to opposite terminals.

Figure 6:
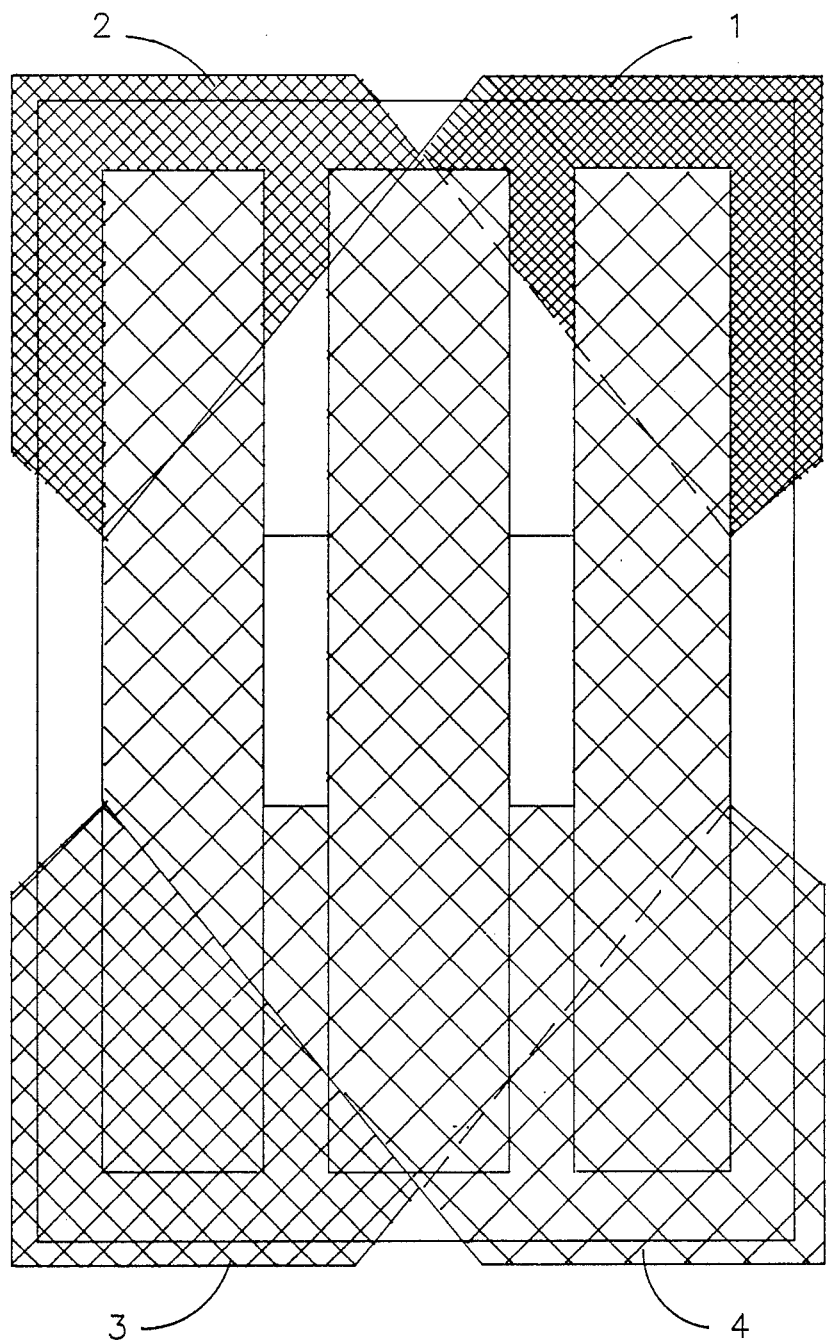
FIG. 6 is a phantom view of a preferred embodiment of the capacitor of the invention.

FIG. 6 shows a phantom view of a preferred embodiment that uses the plates illustrated in FIG. 2 in the sequence shown in FIG. 3. Note that each plate, numbered 1 through 4 are shaded differently and are exposed through the respective tabs at each corner. The terminal that covers the corners 2 and 3 would thus be connected to 2 and 3 plates in each series of 4. A terminal that covers corners 1 and 4 would be connected to the first and fourth plates of each series of 4. Thus, the capacitor would have pairs of alternating plates connected to opposite terminals within the capacitor.

The classic role of the decoupling capacitor is to reduce impedance, minimize switching noise, and maintain buss voltage levels during such switching activity. Impedance of a capacitor is best understood by considering the capacitor to be a series sum of three ideal components, i.e. a resistor which represents the parasitic resistance value of the metallurgical components and contact resistances. Secondly, a parasitic inductor which is the sum of the self and mutual inductances which result from the current path during charge and discharge. Thirdly, a capacitor which represents the desired feature.

As the use frequency increases the inductance takes an increasingly significant role in the overall impedance. For high frequency applications the inductance should be as low as possible. The self inductance results from the current flow within an electrode, much the same as found in transmission lines. The mutual inductance, which is the more dominant, results from the influence of current in one electrode on current in another electrode, much like in a transformer. Cancellation of the magnetic fields due to current flowing in oposite directions will minimize the mutual inductance. The flow of current is determined by the geometrical design which is the teaching of this disclosure.

In this disclosure, the current flow in adjacent electrodes is altered by the design of the electrodes to flow in opposite directions for a significant distance; hence the magnetic fields tend to cancel and the mutual inductance is reduced. This is shown graphically in FIGS. 1 and 2 where the arrows on the lines 11 and 31 represent passes through to another electrode where it passes out of the capacitor (Lines 13 and 33 represent current flow out of the capacitor through an electrode on another plane.) By keeping the angle between the incoming and outgoing current close to 180° the mutual inductance is minimized.

It should be understood that, at the high frequencies we are concerned about, the current which we describe as passing through the dielectric layer from one electrode to another is not the leakage current due to electron or ion transport, but rather the alternating or displacement in the same way as that due to the transport of charge.

The mutual inductance of the electrode configuration in FIG. 2 is lower than that in FIG. 1 because the incoming and outgoing current flow in adjacent electrodes is more nearly anti-parallel (180°). This is schematically represented by lines 31 and 33.

While the invention has been illustrated and described with reference to the preferred embodiments thereof, it is to be understood that the invention is not limited to the precise construction herein disclosed and the right is reserved to all changes and modifications coming within the scope of the invention as defined in the appended claims.

What is claimed is:

1. A low inductance capacitor having a body with a prismatic or polyhedral shape, and including a plurality of internal capacitor plates positioned and maintained in spaced relation with dielectric material, each plate provided with a tab having an end exposed on at least one side of said body, the improvement comprising, each of said plates having said tab projecting diagonally to a corner of said body and having an edge exposed, said plates arranged within said body with said tabs of each successive plate projecting to different corners of said body, a first metallized area in contact with said tabs projecting toward at least one of two of the corners of said body a second metallized area in contact with said tabs projecting toward the remaining corners of said body, said first metallized area and said second metallized area establishing electrical contact with different sets of said plates, and constituting terminals to said capacitor wherein an edge dimension of each of said tabs is large compared to the spacing between adjacent tabs of two succeeding plates along a side of said body so as to keep the angle between the incoming and outgoing current close to 180°, thereby minimizing the mutual inductance, and wherein said capacitor has low inductance.

2. The capacitor of claim 1 wherein said dielectric material of said body is ceramic.

3. The capacitor of claim 2 wherein said ceramic dielectric material is barium titanate.

4. The capacitor of claim 1 wherein said dielectric material is an organic resin material.

5. The capacitor of claim 1 wherein aid first and said second metallized areas are coated with solder.

6. The capacitor of claim 1 wherein said plates have a plurality of parallel narrow slots emanating from the side of said plate opposite said tab.

7. The capacitor of claim 1 wherein the tabs of said plates are arranged in a sequence of four, wherein the tabs serially project toward different corners.

8. A low inductance capacitor having a body with a prismatic or polyhedral shape, and including a plurality of internal capacitor plates positioned and maintained in spaced relation with dielectric material, each plate provided with a tab having an end exposed on at least one side of said body, the improvement comprising, each of said plates having said tab projecting diagonally to a corner of said body and having an edge exposed, said plates arranged within said body with said tabs of each successive plate projecting to different corners of said body, a first metallized area in contact with said tabs projecting toward at least one of two of the corners of said body, a second metallized area in contact with said tabs projecting toward the remaining corners of said body, said first metallized area and said second metallized area establishing electrical contact with different sets of said plates, and constituting terminals to said capacitor wherein an edge dimension of each of said tabs is large compared to the spacing between adjacent tabs of two succeeding plates along a side of said body, wherein said capacitor has low inductance, and wherein the tabs of said plates are arranged in a sequence of two, wherein the tabs alternate toward adjacent corners.

9. The capacitor of claim 8 wherein each of said plates is a layer of Ag-Pd alloy.

10. The capacitor of claim 8 wherein said terminals of said capacitors are each a metal coating covering approximately one third of the exterior area of said body, each terminal in electrical contact with said tabs of said plates projecting to only 2 corners of said body.

11. A low inductance capacitor having a body with a prismatic or polyhedral shape, and including a plurality of internal capacitor plates positioned and maintained in spaced relation with dielectric material, each plate provided with a tab having an end exposed on at least one side of said body, the improvement comprising, each of said plates having said tab projecting diagonally to a corner of said body and having an edge exposed, said plates arranged within said body with said tabs of each successive plate projecting to different corners of said body, a first metallized area in contact with said tabs projecting toward at least one of two of the corners of said body, a second metallized area in contact with said tabs projecting toward the remaining corners of said body, said first metallized area and said second metallized area establishing electrical contact with different sets of said plates, and constituting terminals to said capacitor wherein an edge dimension of each of said tabs is large compared to the spacing between adjacent tabs of two succeeding plates along a side of said body, wherein said capacitor has low inductance, and wherein each of said plates is defined as a square or rectangular shape but having a triangular corner area removed, said corner area being adjacent said tab.

* * * * *